United States Patent
Wang

(10) Patent No.: US 11,667,804 B2
(45) Date of Patent: Jun. 6, 2023

(54) PHOTOCURABLE TRANSPARENT INK COMPOSITION FOR THREE-DIMENSIONAL MOLDING AND PREPARATION METHOD AND APPLICATION THEREOF

(71) Applicant: ZHUHAI SAILNER 3D TECHNOLOGY CO., LTD., Zhuhai (CN)

(72) Inventor: Likun Wang, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 17/874,175

(22) Filed: Jul. 26, 2022

(65) Prior Publication Data

US 2022/0372318 A1    Nov. 24, 2022

Related U.S. Application Data

(63) Continuation of application No. 16/708,402, filed on Dec. 9, 2019, now abandoned, which is a continuation of application No. PCT/CN2018/088167, filed on May 24, 2018.

(30) Foreign Application Priority Data

Aug. 1, 2017   (CN) .......................... 201710648852.5

(51) Int. Cl.
| | |
|---|---|
| C09D 11/38 | (2014.01) |
| B33Y 10/00 | (2015.01) |
| B33Y 70/00 | (2020.01) |
| B29C 64/314 | (2017.01) |
| B29C 64/112 | (2017.01) |
| B33Y 40/10 | (2020.01) |
| C09D 11/037 | (2014.01) |
| C09D 11/101 | (2014.01) |
| C09D 11/107 | (2014.01) |
| C09D 11/322 | (2014.01) |
| B29K 105/00 | (2006.01) |

(52) U.S. Cl.
CPC ............ *C09D 11/38* (2013.01); *B29C 64/112* (2017.08); *B29C 64/314* (2017.08); *B33Y 10/00* (2014.12); *B33Y 40/10* (2020.01); *B33Y 70/00* (2014.12); *C09D 11/037* (2013.01); *C09D 11/101* (2013.01); *C09D 11/107* (2013.01); *C09D 11/322* (2013.01); *B29K 2105/0032* (2013.01)

(58) Field of Classification Search
CPC ..... C09D 11/38; C09D 11/101; C09D 11/107; B29C 64/112; B29C 64/314; B33Y 10/00; B33Y 40/10; B33Y 70/00; B29K 2105/003
See application file for complete search history.

(56) References Cited

U.S. PATENT DOCUMENTS

| | | | | |
|---|---|---|---|---|
| 2013/0253106 A1* | 9/2013 | Saito | ................... | D06P 1/5292 524/104 |
| 2014/0045975 A1* | 2/2014 | Silver | ................... | B82Y 30/00 523/402 |
| 2015/0258770 A1* | 9/2015 | Chan | ................... | B32B 27/20 700/98 |

OTHER PUBLICATIONS

Wikipedia contributors. (Jan. 20, 2023). Room temperature. In Wikipedia, The Free Encyclopedia. Retrieved 19:34, Jan. 28, 2023, from https://en.wikipedia.org/w/lindex.php?title=Room_temperature &oldid=1134684457 (Year: 2023).*

* cited by examiner

*Primary Examiner* — Michael M. Robinson
(74) *Attorney, Agent, or Firm* — J.C. Patents

(57) ABSTRACT

A photocurable transparent ink composition for three-dimensional molding includes the following components in parts by weight: 60-125 parts of a photocuring agent, 0.01-5 parts of a yellowing adjusting agent, 0.5-5 parts of a photoinitiator, and 0.5-5 parts of an auxiliary agent, where the yellowing adjusting agent can absorb light in a wavelength range of 560 nm to 650 nm, so that the ink composition appears transparent. The photocurable transparent ink composition for three-dimensional molding can prevent yellowing of a printed article and make the printed article show a whiter, more transparent, and brighter appearance.

14 Claims, No Drawings

PHOTOCURABLE TRANSPARENT INK COMPOSITION FOR THREE-DIMENSIONAL MOLDING AND PREPARATION METHOD AND APPLICATION THEREOF

CROSS-REFERENCE TO RELATED APPLICATIONS

This application is a continuation of U.S. Patent Application No. U.S. Ser. No. 16/708,402, filed on Dec. 9, 2019, which is a continuation of International Application No. PCT/CN2018/088167, filed on May 24, 2018. The International Application claims the priority benefit of China Patent Application No. 201710648852.5, filed on Aug. 1, 2017. The contents of the above identified applications are incorporated herein by reference in their entireties.

TECHNICAL FIELD

The present disclosure belongs to the field of three-dimensional molding technology, and in particular relates to a photocurable transparent ink composition for three-dimensional molding and a preparation method and an application thereof.

BACKGROUND

An ink for three-dimensional molding can be classified into a photocurable ink and a temperature curable ink according to a curing source. The temperature curable ink usually contains a wax component which cures ink by lowering an ambient temperature below a melting temperature of the wax. However, the temperature curable ink has defects of requiring strict control for the inkjet printing temperature, and easy melting or deformation of printed articles at a high temperature and the like, so that it is limited in application range. The photocurable ink usually contains a photoinitiator and a photocuring agent (for example, an oligomer, a monomer, etc.), and the photoinitiator is excited to generate a radical or a cation under an irradiation of light, and the radical or the cation promotes the photocuring agent to polymerize to cure the ink.

In addition, according to a colorant (i.e., a color of a dye and/or a pigment), the three-dimensional molding ink can be classified into a cyan ink, a magenta ink, a yellow ink, a black ink, a white ink, and a transparent ink (i.e., an ink containing no or substantially no dyes and/or pigments), etc. Transparent ink printed articles are prone to yellowing. The main triggering factors of the yellowing include: 1) quinone structures produced by decomposition of the photoinitiator in the ink causes yellowing of the printed articles; 2) the photoinitiator itself has yellow color, and in a photocuring process, the photoinitiator does not completely react, and a residual photoinitiator causes yellowing of the printed articles; 3) highly active radicals generated after the photoinitiator being light irradiated cause molecular chains polymerized in the ink to be broken to produce substances having a conjugated structure, thereby causing yellowing of the printed articles; and 4) aging of a main resin component in the ink produces conjugated double bonds, carbonyl groups, nitrogen-containing groups, etc., and colored amine substances produced by a certain amount of the conjugated double bonds, and carbonyl groups or nitrogen-containing groups when they are decomposed causes yellowing of the printed articles.

The transparent ink has long been a difficult point in the research of an ink for three-dimensional molding due to various factors that cause yellowing of transparent ink printed articles.

SUMMARY

The present disclosure provides a photocurable transparent ink composition for three-dimensional molding and a preparation method and an application thereof, and the photocurable transparent ink composition for three-dimensional molding can avoid yellowing of a printed article, and make the printed article show a whiter, more transparent and brighter appearance.

The present disclosure provides a photocurable transparent ink composition for three-dimensional molding, including the following components in parts by weight: 60-125 parts of a photocuring agent, 0.01-5 parts of a yellowing adjusting agent, 0.5-5 parts of a photoinitiator, and 0.5-5 parts of an auxiliary agent; where the yellowing adjusting agent can absorb light in a wavelength range of 560 nm to 650 nm, so that the photocurable transparent ink composition for three-dimensional molding appears transparent.

In the present disclosure, the light in the wavelength range of 560 nm to 650 nm is yellow light and light similar to yellow light (for example, yellow-green light, etc.); the yellowing adjusting agent can absorb the light in the wavelength range of 560 nm to 650 nm, that is, can reflect complementary light (such as blue light and violet light) of the light in the wavelength range of 560 nm to 650 nm. The photocurable transparent ink composition for three-dimensional molding of the present disclosure overcomes the yellowing problem of a printed article by a complementary principle of light via adding a yellowing adjusting agent capable of absorbing light in a wavelength range of 560 nm to 650 nm. Such method is not limited by the triggering factors of yellowing, and can not only solve the yellowing problem caused by various triggering factors, but also has low color requirements for the components of the ink composition, expanding a raw material selection range for the ink composition.

It can be understood that the yellowing adjusting agent can absorb the light in the wavelength range of 560 nm to 650 nm, which means that the maximum absorption peak of the yellowing adjusting agent is 560 nm to 650 nm. In the present disclosure, the maximum absorption peak is measured by a Shimadzu UV-2450 ultraviolet spectrophotometer, where a test sample cell had an optical path of 10 mm.

The present disclosure does not strictly limit the specific type of the yellowing adjusting agent. For example, it may be selected from one or more of a photocurable oligomer having a maximum absorption peak of 560 nm to 650 nm capable of photocuring reaction with the photocuring agent, a colorant having a maximum absorption peak of 560 nm to 650 nm incapable of photocuring reaction with the photocuring agent, and a compound having a maximum absorption peak of 560 nm to 650 nm and a reducing property.

Specifically, the photocurable oligomer having a maximum absorption peak of 560 nm to 650 nm may be a blue phase (i.e., blue) acrylate oligomer; for example, CNUVE 151NS from Sartomer Company, and DR-W402, DR-W403, and DR-W406HV, from Changxing Company, etc.

The colorant having a maximum absorption peak of 560 nm to 650 nm may be one or more of dyes and pigments, and has a weight fraction of ≤0.02 parts in the ink composition. A content of the colorant in the present disclosure is calculated based on a solid content in the colorant itself. Preferably, the colorant may be a self-dispersing nano-scale organic pigment paste, such as azo lake red PR57: 1, bronze red PR21, bronze red PR53: 1, light fast scarlet BBN PR48: 1, light fast scarlet BBN PR48: 2, lithol red PR49: 1, lithol red PR49: 2, pigment red G (PR37), pigment red 171 (PR171), pigment red PR122, pigment purple PL (PV23), phthalocyanine blue (PB15:3, PB15:4), indanthrone (PB60), etc.

The compound having a maximum absorption peak of 560 nm to 650 nm and a reducing property may be, for example, methylene blue, Co water or the like.

In the present disclosure, the photocuring agent may have no absorption peak between 350 nm and 700 nm, and at this time the photocuring agent appears colorless and transparent. In addition, the photocuring agent may also have a weak absorption peak, and when the photocuring agent has a weak absorption peak, the photocuring agent has a light transmittance of ≥80%; at this time, the photocuring agent may be slightly yellow or a color similar to yellow light.

In a specific embodiment of the present disclosure, the photocuring agent may be selected from one or more of a photocurable oligomer and a photocurable monomer. Preferably, the photocuring agent includes a photocurable oligomer and a photocurable monomer, and a mass ratio of the photocurable oligomer to the photocurable monomer in the photocuring agent may be (35-65):(25-60). The photocurable oligomer may be a transparent photocurable oligomer, and the photocurable monomer may be a transparent photocurable monomer. Preferably, the photocuring agent is 90 to 95 parts by weight in the photocurable transparent ink composition for three-dimensional molding.

In particular, the mass content of the photocurable oligomer can be controlled to be 35% or more of the total mass of the ink composition, and the printed article has a small shrinkage when the ink composition is subjected to a photocuring reaction, thereby avoiding the shrinkage caused by the polymerization of a large amount of monomers.

Specifically, the transparent photocurable oligomer may be a transparent acrylate oligomer, a transparent epoxy oligomer, or the like. The transparent acrylate oligomer may be an aliphatic urethane acrylate oligomer, an epoxy acrylate oligomer, a pure acrylate oligomer, a silicone acrylate oligomer, or the like.

In the present disclosure, the aliphatic urethane acrylate oligomer refers to an oligomer having a hydrocarbon group in its molecular structure that is a straight chain structure and contains a urethane bond —NHCOO—. It is capable of forming a plurality of hydrogen bonds between polymer chains, so that the cured film has excellent wear resistance, flexibility and elongation at break, and the overall performance is good. Specifically, the aliphatic urethane acrylate oligomer may be, for example, CN966J75 NS, CN8007 NS, CN8011 NS, CN9006 NS, CN9007, CN9010 NS, CN9178 NS, CN963B80, CN985B88, etc. from Sartomer Company; aliphatic urethane acrylate oligomer 6106, 6113, 6115J-80, 6131-1, 6150-100, 6170, 6217, DR-U021, DR-E850, etc. from Taiwan Changxing Company; Unicryl R-7162 and UT70046 from Runau Company; 4425, 4256, G1122, and Genomer 4297 from Ruiang Company; CM8292, CM6030, CM8300, and CM0613 from Guangzhou Chenglan Company; Greatech GT8440, Greatech GT-8220, Greatech GT-8239, Miramer PU340, Miramer PU2100, Miramer PU5000, etc. from Gudi Company.

In the present disclosure, the epoxy acrylate oligomer can be obtained by ring-opening esterification of epoxy resin and acrylic acid, which has high rigidity, strength and thermal stability. Preferably, the epoxy acrylate oligomer may be bisphenol A epoxy acrylate, such as CN104 NS, CN104A80 NS, CN101 NS, and CN115 NS from Sartomer Corporation; 621A-80, 6219-100, 624B-80, etc. from Taiwan Changxing Company.

In the present disclosure, the pure acrylate oligomer has good flexibility and solvent resistance, and has good adhesion to various substrates. Specifically, the pure acrylate oligomer may be, for example, 6530B-40, DR-A815, DR-A830, DR-A845, DR-A870, etc. from Taiwan Changxing Company.

In the present disclosure, the silicone acrylate oligomer is an acrylate polymer having a Si—O bond as a main chain structure, and has characteristics of low yellowing, low viscosity, low odor, and the like. Specifically, the silicone acrylate oligomer may be EB350, and EB1360 from Cytec; 6225 from Changxing Company; B-816, and B-818 from Boxing Technology; EB350, and EB1360 from UCB Company.

In the present disclosure, the transparent epoxy oligomer is an oligomer used in a cationic system and is preferably an aliphatic epoxy resin, which has low odor, low viscosity and low shrinkage, and has advantages of good flexibility, good abrasion resistance and good transparency, and in addition has excellent adhesion to plastics and metals. Specifically, the transparent epoxy oligomer may be UVR6110, UVR6105, UVR6128, UVR6100, and UVR6216 from Dow Chemical; and UVACURE 1500, UVACURE 1534, and UVACURE 156 from UCB, and the like.

In the present disclosure, the transparent photocurable monomer may be a transparent acrylate monomer, a cationic monomer or the like.

Specifically, the transparent acrylate monomer may be an acrylate monomer having no benzene ring structure, thereby avoiding yellowing and aging of a printed article. Further, the transparent acrylate monomer may be an aliphatic acrylate monomer, and the number of conjugated bonds contained in the acrylate monomer is preferably not more than 5, and the acrylate monomer may be a monomer which does not contain more than 5, for example, —C=C—, —N=N—, —N=O— or —C=S—.

Further, the aliphatic acrylate monomer may be selected from one or more of a monofunctional aliphatic acrylate monomer, a difunctional aliphatic acrylate monomer, a polyfunctional aliphatic acrylate monomer, and a cycloalkane acrylate monomer.

Specifically, the monofunctional aliphatic acrylate monomer may be the following monomers: an isodecyl acrylate, such as EM219, EM2191, EM309, etc. from Taiwan Changxing Company; a lauryl acrylate, such as EM215 from Taiwan Changxing Company; an ethoxyethoxyethyl acrylate, such as EOEOEA from DSM Company; and EM211 from Changxing, and the like.

The difunctional aliphatic acrylate monomer may be the following monomers: a difunctional propylene glycol diacrylate, such as dipropylene glycol diacrylate (DPGDA), tripropylene glycol diacrylate (TPGDA); and other glycol diacrylates, for example, 1,6-hexanediol diacrylate (HDDA). More specifically, the dipropylene glycol diacrylate (DPGDA) may be SR508 NS from Sartomer Company, EM222 from Changxing, etc.; the tripropylene glycol diacrylate (TPGDA) may be SR306 NS from Sartomer Company, EM223 from Changxing, etc.; the 1,6-hexanediol diacrylate (HDDA) may be SR238 NS from Sartomer Company, EM221 from Changxing, and HDDA from DSM Company, and the like.

The trifunctional aliphatic acrylate monomer may be ethoxylated trimethylolpropane triacrylate (TMPTA), propoxylated glycerol triacrylate, etc.; where the ethoxylated trimethylolpropane triacrylate (TMPTA) may be EM2382 from Changxing, etc., and the propoxylated glycerol triacrylate may be EM2387 from Changxing, etc.

The polyfunctional aliphatic acrylate monomer may be dipentaerythritol pentaacrylate, such as SR399 LV NS from Sartomer Company, etc.; in particular, the polyfunctional aliphatic acrylate monomer is preferably an aliphatic acrylate monomer having not more than five functional groups. Otherwise, it will affect the volume shrinkage of a printed 3D article.

The cycloalkane acrylate monomer may be 3,3,5-trimethylcyclohexane acrylate, isobornyl acrylate IBOA, tricyclodecane dimethanol diacrylate, etc.; where the 3,3,5-trimethylcyclohexane acrylate may be SR420 from Sartomer Company, EM2104 from Changxing, etc.; the isobornyl acrylate IBOA may be SR506 NS from Sartomer Company, EM70 from Changxing, IBXA from Osaka Chemical, etc.; and the tricyclodecane dimethanol diacrylate may be SR833S from Sartomer Company, and EM2204 from Changxing, etc.

Further, the cationic monomer may be an oxetane compound or a vinyl ether compound; where the vinyl ether compound has a carbon-carbon double bond which is an electron-rich double bond, and has high reactivity and can undergo radical polymerization, cationic polymerization and charge transfer complex alternating copolymerization, and thus can be applied to various radiation curing systems.

Specifically, the oxetane compound may be 3-ethyl-3-hydroxymethyloxetane, 3-ethyl-3-[(2-ethylhexyloxy)methyl]oxetane, 3,3-(oxybisbismethylene-bis-(3-ethyl)oxetane, 1,4-bis[(3-ethyl-3-oxymethyleneoxetane)toluene]benzene, 3-ethyl-3-(phenoxy)methyloxetane, 3-ethyl-3-(p-fluorophenoxy)methyloxetane, for example, MOX-101, MOX-102, MOX-103, MOX-104, etc. developed by Changzhou Tronly Company.

The vinyl ether compound may be triethylene glycol divinyl ether DVE-3, 1,4-cyclohexyl dimethanol divinyl ether CHVE, 4-hydroxybutyl vinyl ether HBVE, dodecyl vinyl ether DDVE, etc.

In particular, when the photocuring agent of the present disclosure is selected from a plurality of transparent photocurable monomers, that is, when the photocuring agent is a mixture of a plurality of transparent acrylate monomers and/or a plurality of cationic monomers, the viscosity of the monomer with the highest content must be less than 15 cps at 25° C.

It is to be noted that when the transparent photocurable monomer component in the present disclosure is selected from a plurality of transparent photocurable monomer compounds, that is, when it is a mixture of a plurality of acrylate monomer compounds and/or a plurality of cationic monomer compounds, the viscosity of the monomer compound with the highest content is less than 15 cps at 25° C.

In the present disclosure, the photoinitiator may be an ultraviolet photoinitiator; where the ultraviolet photoinitiator may be one or more of a radical photoinitiator and a cationic photoinitiator.

Specifically, the radical photoinitiator may be the following initiators: an acylphosphine oxide such as 2,4,6-trimethylbenzoyl-ethoxy-phenylphosphine oxide (trade name: TEPO), 2,4,6-trimethylbenzoyl-diphenylphosphine oxide (trade name: TPO), bis(2,4,6-trimethylbenzoyl)phenylphosphine oxide (trade name: 819), etc.; an α-hydroxyketone initiator, such as 2-hydroxy-2-methyl-1-phenylacetone (trade name 1173), 1-hydroxy-cyclohexyl benzophenone (trade name: 184), 2-hydroxy-2-methyl-1-p-hydroxyethyl ether phenylacetone (trade name: 2959), etc.; and oxime ester initiators such as Irgacure OXE 01 and Irgacure OXE 02 from BASF, which have the structural formulas respectively:

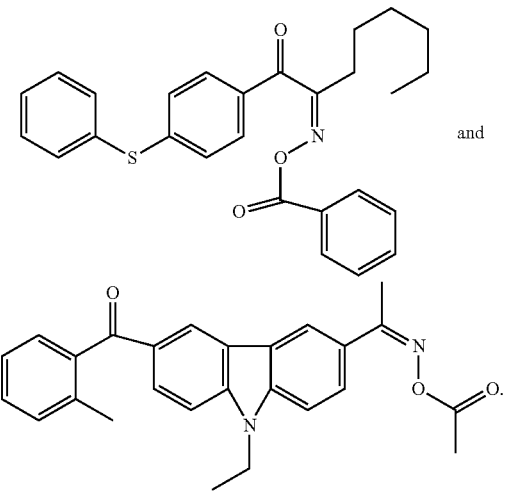

Specifically, the cationic photoinitiator may be a diaryl iodonium salt, a triarylsulfonium salt, an alkylsulfonium salt, an aromatic ferrocenium salt or the like. Where, the diaryliodonium salt may be, for example, a didodecylbenzene iodonium salt, a long-chain alkoxydiphenyliodonium salt or the like; the triarylsulfonium salt has better thermal stability than the diaryl iodonium salt, does not decompose when heated to 300° C., and has high photoinitiation activity, and may be, for example, UV 1 6974, UV 1 6976, UV 1 6990, UV 1 6992, etc. from Dow Chemical; and the most representative in the aromatic ferrocenium salt is η6-isopropylphenyl ferrocene hexafluorophosphate, such as Irgacure 250, Irgacure 261, etc. from BASF Company.

In the present disclosure, the auxiliary agent may be selected from one or more of a toughening agent, an antifoaming agent, a stabilizer, and a surfactant.

Specifically, the toughening agent may be polycaprolactone triol and polyol products, such as 305T, 205N from Yisheng company, and Greatech GT8003 from Gudi company.

The antifoaming agent is mainly used to eliminate bubbles generated during filtration and printing, to avoid the generated bubbles affecting print fluency. The antifoaming agent may be a silicone-free polymer, such as silicone-free antifoaming agents TEGO Airex 920, TEGO Airex 921, etc. from Tego.

A stabilizer (i.e., a polymerization inhibitor) is used to prevent deposition of the ink composition, thereby ensuring stability during storage of the ink composition. The present disclosure does not strictly limit the kind of the stabilizer as long as the above requirements are satisfied. The stabilizer may be, for example, GENORAD 16, GENORAD 18, GENORAD 20, and GENORAD 22 from Ruiang Company, alkyl acrylate phosphate PM2010 from Jingde Chemical, polymerization inhibitor ZJ-701 from TCI Company, Tinuvin 234, Tinuvin 770, Irganox 245, Cytec S100, Cytec 130, etc. from BASF, and Irgastab UV10, Irgastab UV 22, etc. from Ciba.

The surfactant is mainly used to effectively reduce a surface tension of an ink and improve a leveling of the ink. In particular, the surfactant can also participate in a photocuring reaction, thereby making a printed article show a transparent appearance. Specifically, the surfactant may be one or more of a silicone acrylate that is capable of radiation crosslinking and a modified polysiloxane polymer. The silicone acrylate that is capable of radiation crosslinking may be TEGO RAD 2010, 2011, 2100, 2200N, 2250, etc. from Tego, and the silicone acrylate that is capable of radiation crosslinking can participate in a photocuring reaction and a cross-linking reaction, thereby facilitating the suppression of the dimming of the printed article. The modified polysiloxane polymer may be BYK-333, BYK-371, and BYK-377 from BYK Company, and Tego wet 270 and Tego Glide 450 from Tego Company, etc.

The photocurable transparent ink composition for three-dimensional molding according to an embodiment of the present disclosure includes, based on 100% by weight of a total weight of the ink composition: 35-65% of a transparent photocurable oligomer, 25-60% of a transparent photocurable monomer, 0.01-5% of a yellowing adjusting agent, 0.5-5% of a photoinitiator, and 0.5-5% of an auxiliary agent; where the yellowing adjusting agent can absorb light in a wavelength range of 560 nm to 650 nm so that the photocurable transparent ink composition for three-dimensional molding appears transparent.

Further, the photocurable transparent ink composition for three-dimensional molding of the present disclosure has a viscosity of 25-70 cps and a surface tension of 20-30 dyn at room temperature (for example, 25° C.), and has a viscosity of 9-14 cps and a surface tension of 20-35 dyn at an ejection temperature (40-60° C.).

Further, the photocurable transparent ink composition for three-dimensional molding of the present disclosure may contain no volatile solvent. In particular, all components in the photocurable transparent ink composition for three-dimensional molding of the present disclosure may participate in a photocuring reaction. At this time, the ink composition is free of VOC emissions and does not cause environmental pollution.

The photocurable transparent ink composition for three-dimensional molding of the present disclosure has a wide application condition, and is applicable not only to a high-viscosity photocurable resin composition (for example, SLA resin) but also to a photocurable ink for three-dimensional inkjet printing. In particular, the photocurable transparent ink composition for three-dimensional molding of the present disclosure can conduct an inkjet printing at a low temperature (for example, 40-60° C.), has good print fluency and prolongs a life of a print head.

The present disclosure also provides a preparation method of the above-mentioned photocurable transparent ink composition for three-dimensional molding, includes the following steps:

1) mixing 60-125 parts of the photocuring agent with 0.5-5 parts of the auxiliary agent to obtain a first mixture;

2) adding 0.5-5 parts of the photoinitiator to the first mixture to completely dissolve the photoinitiator to obtain a second mixture;

3) adding 0.01-5 parts of the yellowing adjusting agent to the second mixture until this mixing system is transparent to obtain a third mixture; and 4) filtering the third mixture and collecting a filtrate.

The present disclosure does not strictly limit the order of addition of the components in the step 1). In particular, the present disclosure can perform a two-stage filtration on the third mixture by using a microporous filter membrane; where the first stage filtration is performed by using a glass fiber membrane having a pore diameter of 0.45 µm, a second stage filtration is performed by using a polypropylene membrane (abbreviated as PP membrane) having a pore diameter of 0.22 µm. Using stepwise filtration, and making the pore diameter of the microporous filter membrane of the previous filtration larger than the pore diameter of the microporous filter membrane of the latter filtration, and the pore diameter of the microporous filter membrane of the last filtration smaller than the pore diameter of orifice of the printing nozzle during the inkjet printing process is advantageous for ensuring the stability of the ink composition and is advantageous for liquefaction and ejection of the ink composition.

Further, the preparation method of the present disclosure may further include: performing degassing on the filtrate to obtain the photocurable transparent ink composition for three-dimensional molding. Specifically, an operation mode of a degassing processing may be selected from one of decompression degassing, atmospheric degassing, and heating degassing. In addition, the time of the degassing processing may be not less than 1 h, for example, 1-3 h. By performing the degassing processing on the ink composition, the ink composition can have a good fluency during use, and will not cause a print line broken due to the interference of bubbles in the ink composition to ultimately affect a molding accuracy of a 3D object.

In the present disclosure, it is understood that the preparation of the photocurable transparent ink composition for three-dimensional molding needs to be performed in an environment outside a range of an initiation wavelength of a selected photoinitiator, thereby avoiding light in the environment inducing polymerization of components in the ink composition.

The preparation method of the photocurable transparent ink composition for three-dimensional molding of the present disclosure can be completed by mixing and filtering, is simple and easy to operate, and not only can form a stable ink composition but also can ensure liquefaction and ejection of the ink composition, The preparation method makes the ink composition more convenient to use and is particularly suitable for printing of 3D objects.

The present disclosure further provides a three-dimensional molding method for performing a three-dimensional inkjet printing by using the above-described photocurable transparent ink composition for three-dimensional molding to obtain a printed article; where an ejection temperature for the three-dimensional inkjet printing is 40-60° C.

Further, the printed article (having a size of, for example, 50 mm×50 mm×2 mm) molded by the three-dimensional molding method of the present disclosure has a hue range of L value 80-90, a value −1.00 to 2.00, and b value −10.00-0.

The three-dimensional molding method of the present disclosure utilizes the above-mentioned photocurable transparent ink composition for three-dimensional molding to perform a three-dimensional molding, and in the process of the three-dimensional molding, the ink composition at an interface layer is irradiated by ultraviolet light, and when the yellowing adjusting agent in the ink composition is at least one of a photocurable oligomer having a maximum absorption peak at 560 nm to 650 nm and a compound having a reducing property and a maximum absorption peak at 560 nm to 650 nm and, the yellowing adjusting agent participates in the photocuring reaction, and chemically reacts with the photocuring agent in the ink composition to cure the ink composition. A blue or violet light reflected by the yellowing adjusting agent is superimposed with the yellow light or its approximate light of the object formed after curing, to complementarily form white light, so that the white light reflected by the object to human eyes is increased, and at this time the printed object observed by naked eyes becomes noticeably white, bright and transparent. When the yellowing adjusting agent in the ink composition is a colorant having a maximum absorption peak at 560 nm to 650 nm, the colorant does not participate in the photocuring reaction and acts as a color light adjusting agent, and the blue or violet light reflected by the colorant is superimposed with the yellow light or its approximate light of the object formed after curing, to complementarily form white light, so that the white light reflected by the object to human eyes is increased, and at this time the printed object observed by naked eyes becomes noticeably white, bright and transparent.

DETAILED DESCRIPTION

In order to make the objectives, technical solutions, and advantages of the present disclosure more clear, the technical solutions in the examples of the present disclosure will be clearly and completely described in the following with reference to the examples of the present disclosure. It is obvious that the described examples are only a part of examples of the present disclosure, but not all examples. All other examples obtained by those skilled in the art based on the examples of the present disclosure without creative efforts are within the scope of the present disclosure.

Example 1

The photocurable transparent ink composition for three-dimensional molding of the present example includes the following components by weight:
aliphatic urethane acrylate oligomer CM0613 (photocurable oligomer) 50 g,
tricyclodecane dimethanol diacrylate EM2204 (photocurable monomer) 16 g,
ethoxyethoxyethyl acrylate EOEOEA (photocurable monomer) 28.2 g,
blue phase acrylate oligomer CNUVE151NS (yellowing adjusting agent) 4.7 g,
TPO (radical photoinitiator) 0.58 g,
GENORAD16 (stabilizer) 0.5 g,
BYK-377 (surfactant) 0.02 g.
Where the maximum absorption peak of the yellowing adjusting agent is measured by an ultraviolet spectrophotometer, and the results are shown in Table 1.
The preparation method of the above-described photocurable transparent ink composition for three-dimensional molding is as follows:
1. putting 50 g of the aliphatic urethane acrylate oligomer CM0613, 16 g of the tricyclodecane dimethanol diacrylate EM2204, 28.2 g of the ethoxyethoxyethyl acrylate EOEOEA, 0.02 g of the BYK-377 and 0.5 g of the GENORAD16 into a glass vessel, and stirring with a stirrer until they are uniformly mixed to obtain a first mixture;
2. adding 0.58 g of the TPO radical photoinitiator to the first mixture, and stirring continuously until the radical photoinitiator is completely dissolved to obtain a second mixture;
3. adding 4.7 g of the yellowing adjusting agent, the blue phase acrylate oligomer CNUVE 151NS, to the above second mixture, and stirring continuously until all the additives are completely fused to obtain a transparent third mixture;
4. performing a first stage filtration on the third mixture using a glass fiber membrane of 0.45 μm, followed by a second stage filtration using a PP membrane of 0.22 μm to obtain a filtrate.

5. filtering the filtrate under a reduced pressure for 1 hour under a vacuum of 0.1 MPa to remove bubbles in the filtrate, to obtain the photocurable transparent ink composition for three-dimensional molding.
The viscosity and surface tension of the photocurable transparent ink composition for three-dimensional molding prepared above are measured by a DVI digital viscometer and a BZY-1 fully automatic surface tension meter, respectively, and the results are shown in Table 1.

Example 2

The photocurable transparent ink composition for three-dimensional molding of the present example includes the following components by weight:
aliphatic urethane acrylate oligomer Unicryl R-7162 (photocurable oligomer) 41 g,
silicone UV resin oligomer 6225 (photocurable oligomer) 24 g,
3,3,5-trimethylcyclohexane acrylate SR420 (photocurable monomer) 25.2 g,
TPO (acylphosphine oxide radical photoinitiator) 1.8 g,
819 (bis(2,4,6-trimethylbenzoyl)phenylphosphine oxide, radical photoinitiator) 3.0 g,
Greatech GT8003 (toughening agent) 4.2 g,
TEGO Airex 920 (antifoaming agent) 0.586 g,
ZJ-701 (stabilizer) 0.2 g,
Bronze red (PR21) (red pigment, yellowing adjusting agent) 0.006 g,
phthalocyanine blue (PB15:4) (blue pigment, yellowing adjusting agent) 0.008 g.
Where the maximum absorption peak of the mixture of the yellowing adjusting agents (i.e., the mixture of the bronze red (PR21) and the phthalocyanine blue (PB15:4)) is measured by an ultraviolet spectrophotometer, and the results are shown in Table 1.
The preparation method of the photocurable transparent ink composition for three-dimensional molding is as follows:
1. putting 41 g of the aliphatic urethane acrylate oligomer Unicryl R-7162, 24 g of the silicone UV resin oligomer 6225, 25.2 g of the 3,3,5-trimethylcyclohexane acrylate SR420, 4.2 g of the Greatech GT8003, 0.586 g of the TEGO Airex 920 and 0.2 g of the ZJ-701 into a glass vessel and stirring with a stirrer until they are uniformly mixed to obtain a first mixture;
2. adding 1.8 g of the photoinitiator TPO and 3.0 g of the photoinitiator 819 to the first mixture, and stirring continuously until the radical photoinitiators are completely dissolved to obtain a second mixture;
3. adding 0.006 g of the bronze red (PR21) and 0.008 g of the phthalocyanine blue (PB 15:4) to the second mixture, and stirring continuously until all the additives are completely fused to obtain a transparent third mixture;
4. performing a first stage filtration on the third mixture using a glass fiber membrane of 0.45 μm, followed by a second stage filtration using a PP membrane of 0.22 μm to obtain a filtrate;
5. filtering the filtrate under a reduced pressure for 2 hours under a vacuum of 0.1 MPa to remove bubbles in the filtrate to obtain the photocurable transparent ink composition for three-dimensional molding.
The viscosity and surface tension of the photocurable transparent ink composition for three-dimensional molding prepared above are measured by a DVI digital viscometer and a BZY-1 fully automatic surface tension meter, respectively, and the results are shown in Table 1.

Example 3

The photocurable transparent ink composition for three-dimensional molding of the present example includes the following components by weight:
aliphatic urethane acrylate oligomer CN985B88 (photocurable oligomer) 28 g,
pure acrylate oligomer DR-A870 (photocurable oligomer) 8.4 g,
1,6-hexanediol diacrylate EM221 (photocurable monomer) 58 g,
TEPO (acylphosphine oxide radical photoinitiator) 1.6 g,
184 (α-hydroxyketone radical photoinitiator) 1.2 g
modified polysiloxane polymer BYK-333 (surfactant) 0.5 g,
silicone acrylate TEGO RAD 2011 (surfactant) 1.6 g,
GENORAD 20 (stabilizer) 0.6 g,
methylene blue (yellowing adjusting agent) 0.1 g.

Where the maximum absorption peak of the yellowing adjusting agent is measured by an ultraviolet spectrophotometer, and the results are shown in Table 1.

The preparation method of the photocurable transparent ink composition for three-dimensional molding is as follows:

1. putting 28 g of the aliphatic urethane acrylate oligomer CN985B88, 8.4 g of the pure acrylate oligomer DR-A870, 58 g of the 1,6-hexanediol diacrylate EM221, 0.5 g of the modified polysiloxane polymer BYK-333, 1.6 g of the silicone acrylate TEGO RAD 2011 and 0.6 g of the GENORAD 20 into a glass vessel and stirring with a stirrer until they are uniformly mixed to obtain a first mixture;

2. adding 1.6 g of the radical photoinitiator TEPO and 1.2 g of the radical photoinitiator 184 to the first mixture, and stirring continuously until the radical photoinitiators are completely dissolved to obtain a second mixture;

3. adding 0.1 g of the yellowing adjusting agent methylene blue to the second mixture, and stirring continuously until all the additives are completely fused to obtain a transparent third mixture;

4. performing a first stage filtration on the third mixture using a glass fiber membrane of 0.45 μm, followed by a second stage filtration using a PP membrane of 0.22 μm to obtain a filtrate;

5. performing a degassing processing on the filtrate at 50° C. for 30 minutes to remove bubbles in the filtrate to obtain the photocurable transparent ink composition for three-dimensional molding.

The viscosity and surface tension of the photocurable transparent ink composition for three-dimensional molding prepared above are measured by a DV-I digital viscometer and a BZY-1 fully automatic surface tension meter, respectively, and the results are shown in Table 1.

Example 4

The photocurable transparent ink composition for three-dimensional molding of the present example includes the following components by weight:
aliphatic epoxy resin UVR6110 (photocurable oligomer) 35 g,
MOX-101 (oxetane monomer, photocurable monomer) 32 g,
triethylene glycol divinyl ether DVE-3 (photocurable monomer) 26 g,
UV1 6976 (cationic photoinitiator) 2.6 g,
305T (toughening agent) 3.8 g,
TEGO Airex 921 (antifoaming agent) 0.388 g,
PM2010 (stabilizer) 0.2 g,
pigment purple PL (PV23) (yellowing adjusting agent) 0.005 g,
phthalocyanine blue (PB15:3) (blue pigment, yellowing adjusting agent) 0.007 g.

Where the maximum absorption peak of the mixture of the yellowing adjusting agents (i.e., the mixture of the pigment purple PL (PV23) and the phthalocyanine blue (PB15:3)) is measured by an ultraviolet spectrophotometer, and the results are shown in Table 1.

The preparation method of the photocurable transparent ink composition for three-dimensional molding is as follows:

1. putting 35 g of the aliphatic epoxy resin UVR6110, 32 g of the MOX-101, 26 g of the triethylene glycol divinyl ether DVE-3, 3.8 g of the 305T, 0.388 g of the TEGO Airex 921 and 0.2 g of the PM2010 into a glass vessel and stirring with a stirrer until they are uniformly mixed to obtain a first mixture;

2. adding 2.6 g of the cationic photoinitiator UV1 6976 to the first mixture, and stirring continuously until the radical photoinitiator is completely dissolved to obtain a second mixture;

3. adding 0.005 g of the pigment purple PL (PV23) and 0.007 g of the phthalocyanine blue (PB 15:3) to the above second mixture, and stirring continuously until all the additives are completely fused to obtain a transparent third mixture;

4. performing a first stage filtration on the third mixture using a glass fiber membrane of 0.45 μm, followed by a second stage filtration using a PP membrane of 0.22 μm to obtain a filtrate;

5. allowing the filtrate to stand under normal pressure for 3 hours to remove bubbles in the filtrate to obtain the photocurable transparent ink composition for three-dimensional molding.

The viscosity and surface tension of the photocurable transparent ink composition for three-dimensional molding prepared above are measured by a DVI digital viscometer and a BZY-1 fully automatic surface tension meter, respectively, and the results are shown in Table 1.

Example 5

The photocurable transparent ink composition for three-dimensional molding of the present example includes the following components by weight:
bisphenol A epoxy acrylate CN115 NS (photocurable oligomer) 20 g,
epoxy resin UVR6105 (photocurable oligomer) 30 g,
1,4-cyclohexyl dimethanol divinyl ether CHVE (photocurable monomer) 20 g,
isobornyl acrylate IBOA (photocurable monomer) 20 g,
blue phase acrylate oligomer DR-W402 (yellowing adjusting agent) 2.6 g,
UV1 6974 (cationic photoinitiator) 2.5 g,
TPO (acylphosphine oxide radical photoinitiator) 2 g,
305T (toughening agent) 2.7 g,
PM2010 (stabilizer) 0.2 g.

Where the maximum absorption peak of the yellowing adjusting agent is measured by an ultraviolet spectrophotometer, and the results are shown in Table 1.

The preparation method of the photocurable transparent ink composition for three-dimensional molding is as follows:

1. putting 20 g of the bisphenol A epoxy acrylate CN115 NS, 30 g of the epoxy resin UVR6105, 20 g of the 1,4-cyclohexyl dimethanol divinyl ether CHVE, 20 g of the isobornyl acrylate IBOA, 2.7 g of the 305T and 0.2 g of the PM2010 into a glass vessel, and stirring with a stirrer until they are uniformly mixed to obtain a first mixture;
2. adding 2.5 g of the UV1 6974 and 2 g of the TPO to the first mixture, and stirring continuously until the radical photoinitiator is completely dissolved to obtain a second mixture;
3. adding 2.6 g of the blue phase acrylate oligomer DR-W402 to the above second mixture, and stirring continuously until all the additives are completely fused to obtain a transparent third mixture;
4. performing a first stage filtration on the third mixture using a glass fiber membrane of 0.45 μm, followed by a second stage filtration using a PP membrane of 0.22 μm to obtain a filtrate;
5. filtering the filtrate under reduced pressure for 3 hours under a vacuum of 0.1 MPa to remove bubbles in the filtrate to obtain the photocurable transparent ink composition for three-dimensional molding.

The viscosity and surface tension of the photocurable transparent ink composition for three-dimensional molding prepared above are measured by a DV-I digital viscometer and a BZY-1 fully automatic surface tension meter, respectively, and the results are shown in Table 1.

Comparative Example 1

The photocurable transparent ink composition for three-dimensional molding of this comparative example includes the following components by weight:
aliphatic urethane acrylate oligomer CM0613 50 g,
tricyclodecane dimethanol diacrylate EM2204 20.7 g,
ethoxyethoxyethyl acrylate EOEOEA 28.2 g,
TPO 0.58 g,
GENORAD16 0.5 g,
BYK-377 0.02 g.

The preparation method of the photocurable transparent ink composition for three-dimensional molding can be performed by referring to Example 1 (excluding the step 3 of adding the yellowing adjusting agent in Example 1), and measurement results of the viscosity and surface tension of the photocurable transparent ink composition for three-dimensional molding are shown in Table 1.

Comparative Example 2

The photocurable transparent ink composition for three-dimensional molding of this comparative example includes the following components by weight:
aliphatic urethane acrylate oligomer Unicryl R-7162 41.014 g,
silicone UV resin oligomer 6225 24 g,
3,3,5-trimethylcyclohexane acrylate SR420 25.2 g,
TPO (acylphosphine oxide radical photoinitiator) 1.8 g,
819 (bis(2,4,6-trimethylbenzoyl)phenylphosphine oxide 3.0 g,
Greatech GT8003 4.2 g,
TEGO Airex 920 0.586 g,
ZJ-701 0.2 g.

The preparation method of the photocurable transparent ink composition for three-dimensional molding can be performed by referring to Example 2 (excluding the step 3 of adding the yellowing adjusting agent in Example 2), and the measurement results of the viscosity and surface tension of the photocurable transparent ink composition for three-dimensional molding are shown in Table 1.

Comparative Example 3

The photocurable transparent ink composition for three-dimensional molding of this comparative example includes the following components by weight:
aliphatic urethane acrylate oligomer CN985B88 28.1 g,
pure acrylate oligomer DR-A870 8.4 g,
1,6-hexanediol diacrylate EM221 58 g,
TEPO (acylphosphine oxide radical photoinitiator) 1.6 g,
184 (α-hydroxyketone radical photoinitiator) 1.2 g,
modified polysiloxane polymer BYK-333 0.5 g,
silicone acrylate TEGO RAD 2011 1.6 g,
GENORAD 20 0.6 g.

The preparation method of the photocurable transparent ink composition for three-dimensional molding can be performed by referring to Example 3 (excluding the step 3 of adding the yellowing adjusting agent in Example 3), and the measurement of the viscosity and surface tension of the photocurable transparent ink composition for three-dimensional molding are shown in Table 1.

Comparative Example 4

The photocurable transparent ink composition for three-dimensional molding of this comparative example includes the following components by weight:
aliphatic epoxy resin UVR6110 35.012 g,
MOX-101 (oxetane monomer) 32 g,
triethylene glycol divinyl ether DVE-3 26 g,
UV1 6976 (cationic photoinitiator) 2.6 g,
305T (toughening agent) 3.8 g,
TEGO Airex 921 (antifoaming agent) 0.388 g,
PM2010 (stabilizer) 0.2 g.

The preparation method of the photocurable transparent ink composition for three-dimensional molding can be performed by referring to Example 4 (excluding the step 3 of adding the yellowing adjusting agent in Example 4), and the measurement results of the viscosity and surface tension of the photocurable transparent ink composition for three-dimensional molding are shown in Table 1.

Comparative Example 5

The photocurable clear ink composition for three-dimensional molding of this comparative example includes the following parts by weight:
Bisphenol A epoxy acrylate CN115 NS 22.6 g
Epoxy resin UVR6105 30 g
1,4-cyclohexyl dimethanol divinyl ether CHVE 20 g
Isobornyl acrylate IBOA 20 g
UV1 6974 (cationic photoinitiator) 2.5 g
TPO (acylphosphine oxide radical photoinitiator) 2 g
305T (toughening agent) 2.7 g
PM2010 (stabilizer) 0.2 g The preparation method of the photocurable transparent ink composition for three-dimensional molding can be performed by referring to Example 5 (excluding the step 3 of adding the yellowing adjusting agent in Example 5), and the measurement results of the viscosity and surface tension of the photocurable transparent ink composition for three-dimensional molding are shown in Table 1.

Example 6

The ink compositions of Embodiments 1-5 and Comparative examples 1-5 are respectively applied to a 3D photocurable inkjet printer with an industrial nozzle, with the wavelength of the ultraviolet light source being set to 395 nm, and square articles of 50 mm (length)×50 mm (width)×2 mm (thickness) are printed respectively at suitable ejection temperatures (see Table 1).

The articles are tested as follows:

1. Accuracy Test

The accuracy test is mainly reflected by a volume shrinkage rate. The test method is:

A density ρ1 before curing of the ink composition and a density ρ2 after complete curing of the ink composition are measured by a pycnometer method at 25° C. with water as a reference, and a volume shrinkage ratio is calculated according to the following formula:

$$\text{volume shrinkage ratio} \% = \frac{\rho_2 - \rho_1}{\rho_2} \times 100\%.$$

2. Light Transmittance Test

It is performed by referring to GB/T 2410-2008 for measuring the light transmittance and haze of transparent plastics. Specifically, the light transmittance, which is a ratio of a luminous flux through a sample to a luminous flux emitted onto the sample and expressed as a percentage, is measured by an ultraviolet light visible spectrophotometer.

3. Hue Measurement

L*a*b of square articles is tested using an X-rite color difference instrument. L*a*b values of the square articles represent a hue of colors of the square articles, i.e., color space coordinates of the colors. Where: L represents a brightness, and L has a value range from 0 to 100, where 0 represents black, 100 represents white; a represents a range from red to green, b represents a range from blue to yellow, and the ranges of a and b are both from +120 to −120, where +120a is red, and gradually transits to −120a to become green; likewise, +120 b is yellow and −120 b is blue.

TABLE 1

Test results of photocurable transparent ink compositions for three-dimensional molding and printed articles

| Ink composition | Example 1 | Example 2 | Example 3 | Example 4 | Example 5 | Comparative examample 1 | Comparative examample 2 | Comparative examample 3 | Comparative examample 4 | Comparative examample 5 |
|---|---|---|---|---|---|---|---|---|---|---|
| Maximum absorption peak of yellowing adjusting agent added (nm) | 561.7 | 595.4 | 641.2 | 620.4 | 580.2 | — | — | — | — | — |
| Viscosity at room temperature (cps) | 36.4 | 45.6 | 60.1 | 32.5 | 54.2 | 34.5 | 44.8 | 59.8 | 32.2 | 52.8 |
| Surface tension at room temperature (dyn) | 24.5 | 22.2 | 23.5 | 24.8 | 22.9 | 24.2 | 22.5 | 23.4 | 24.1 | 22.4 |
| ejection temperature (° C.) | 45 | 50 | 60 | 40 | 60 | 45 | 50 | 60 | 40 | 60 |
| Viscosity at ejection temperature (cps) | 12.4 | 12.8 | 12.8 | 11.8 | 12.2 | 12.3 | 12.8 | 12.7 | 11.7 | 12.3 |
| Surface tension at ejection temperature (dyn) | 22.7 | 22.1 | 21.7 | 22.6 | 20.4 | 22.7 | 22.2 | 21.6 | 22.4 | 20.4 |
| Shrinkage rate (%) | 3.98 | 3.25 | 4.28 | 2.52 | 2.78 | 4.02 | 3.42 | 4.35 | 2.65 | 2.84 |
| Fluency | good | good | good | good | good | good | good | good | good | good |
| Light transmittance (%) | 93.7 | 92.6 | 92.4 | 91.8 | 93.1 | 93.2 | 92.5 | 91.4 | 91.7 | 92.4 |
| L | 90 | 85 | 87 | 82 | 89 | 89 | 86 | 88 | 84 | 87 |
| a | −0.98 | −0.03 | −0.5 | 1.68 | −0.11 | 3.52 | 2.14 | 1.14 | 2.52 | 0.54 |
| b | −0.21 | −5.42 | −9.54 | −6.42 | −2.54 | 6.24 | 4.02 | 12.42 | 2.54 | 3.45 |

From the above test results, it can be seen that:

1. the square article with a 50 mm (length)×50 mm (width)×2 mm (thickness) which is printed using the photocurable transparent ink composition containing a yellowing adjusting agent according to each embodiment of the present disclosure satisfies an L value of 80~90, an a value of −1.00 to 2.00, a b value of −10.00 to 0 when performing a hue measurement, thereby indicating that the article printed using the photocurable transparent ink composition of the present disclosure overcomes the yellowing defect;

2. from the results of the light transmittance, it is known that the values of the light transmittance of objects printed by the photocurable transparent ink composition of the present disclosure are greater than 92%, thereby indicating that the objects printed using the photocurable transparent ink composition of the present disclosure have a good transparency;

3. the photocurable transparent ink composition of the present disclosure has good printing fluency, a low viscosity at room temperature, a low ejection temperature, less than 5% of shrinkage ratio of the printed object, and a high accuracy.

Finally, it should be noted that the above examples are merely used to illustrate the technical solutions of the present disclosure, rather than limiting them. Although the present disclosure has been described in detail with reference to the foregoing examples, those skilled in the art should understand that the technical solutions described in the foregoing examples may be modified, or some or all of the technical features therein may be equivalently substituted; and these modifications or substitutions do not make the essences of corresponding technical solutions deviate from the scope of the technical solutions of the examples of the present disclosure.

What is claimed is:

1. A three-dimensional molding method for performing a three-dimensional inkjet printing by using the photocurable transparent ink composition to obtain a printed article; wherein the photocurable transparent ink composition comprises the following components in parts by weight: 60-125 parts of a photocuring agent, 0.01-5 parts of a yellowing adjusting agent, 0.5-5 parts of a photoinitiator, and 0.5-5 parts of an auxiliary agent; wherein the yellowing adjusting agent is capable of absorbing light in a wavelength range of 560 nm to 650 nm, so that the photocurable transparent ink composition for three-dimensional molding appears transparent;

the yellowing adjusting agent is selected from one or more of a photocurable oligomer, a colorant, and a reducing agent;

wherein an ejection temperature for the three-dimensional inkjet printing is 40-60° C.;

the printed article with a thickness of 2 mm has a hue range as follows: L value is 80 to 90, a value is −1.00 to 2.00, and b value is −10.00 to 0; and has a light transmittance value of greater than 92%;

wherein the photocurable transparent ink composition for three-dimensional molding has a viscosity of 25-70 cps and a surface tension of 20-30 dyn at 25° C., and has a viscosity of 9-14 cps and a surface tension of 20-35 dyn at 40-60° C.

2. The three-dimensional molding method according to claim 1, wherein the three-dimensional inkjet printing is performed using an ultraviolet light source.

3. The three-dimensional molding method according to claim 1, wherein the photocurable oligomer is selected from blue phase acrylate oligomers; the colorant is selected from at least one of dyes and pigments; and the reducing agent is selected from compounds having reducing properties and being capable of participating in a photocuring reaction.

4. The three-dimensional molding method according to claim 1, wherein the yellowing adjusting agent comprises the colorant, and the colorant is ≤0.02 parts by weight.

5. The three-dimensional molding method according to claim 1, wherein the photocuring agent in the photocurable transparent ink composition for three-dimensional molding is 90 to 95 parts by weight.

6. The three-dimensional molding method according to claim 1, wherein the photocuring agent comprises a photocurable oligomer and a photocurable monomer, and a mass ratio of the photocurable oligomer to the photocurable monomer in the photocuring agent is (35-65):(25-60).

7. The three-dimensional molding method according to claim 6, wherein the photocurable oligomer is a transparent photocurable oligomer, and the photocurable monomer is a transparent photocurable monomer.

8. The three-dimensional molding method according to claim 7, wherein the transparent photocurable oligomer is selected from one or more of a transparent acrylate oligomer and a transparent epoxy oligomer, and the transparent photocurable monomer is selected from one or more of a transparent acrylate monomer and a cationic monomer.

9. The three-dimensional molding method according to claim 1, wherein the auxiliary agent is selected from one or more of a toughening agent, an antifoaming agent, a stabilizer, and a surfactant.

10. The three-dimensional molding method according to claim 1, wherein a preparation method of the photocurable transparent ink composition comprises:

1) mixing 60-125 parts of the photocuring agent with 0.5-5 parts of the auxiliary agent to obtain a first mixture;

2) adding 0.5-5 parts of the photoinitiator to the first mixture to completely dissolve the photoinitiator to obtain a second mixture;

3) adding 0.01-5 parts of the yellowing adjusting agent to the second mixture until this mixing system is transparent to obtain a third mixture;

4) filtering the third mixture and collecting a filtrate.

11. The three-dimensional molding method according to claim 10, wherein the third mixture is subjected to a two stage filtration using a microporous filter membrane; wherein a first stage filtration is performed by using a glass fiber membrane having a pore diameter of 0.45 μm, and a second stage filtration is performed by using a polypropylene membrane having a pore diameter of 0.22 μm.

12. The three-dimensional molding method according to claim 1, wherein the preparation method further comprises: performing degassing on the filtrate to obtain the photocurable transparent ink composition for three-dimensional molding.

13. A three-dimensional molding printed article obtained by an inkjet printing using the three-dimensional molding method according to claim 1.

14. The three-dimensional molding printed article according to claim 13, wherein the printed article with a thickness of 2 mm has a shrinkage ratio of less than 5%.

* * * * *